US008547539B2

(12) United States Patent
Ramos et al.

(10) Patent No.: US 8,547,539 B2
(45) Date of Patent: Oct. 1, 2013

(54) SYSTEM AND METHOD FOR DETECTION OF FLEXIBLE PIPE ARMOR WIRE RUPTURES (75) Inventors: Rogerio Ramos, Eastleigh (GB); Gareth Lees, Southampton (GB); Stephen Mullens, Welwyn Garden City (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/062,701

(22) PCT Filed: Sep. 8, 2009

(86) PCT No.: PCT/US2009/056261
§ 371 (c)(1),
(2), (4) Date: May 23, 2011

(87) PCT Pub. No.: WO2010/028387
PCT Pub. Date: Mar. 11, 2010

(65) Prior Publication Data
US 2011/0292384 A1    Dec. 1, 2011

Related U.S. Application Data (60) Provisional application No. 61/094,996, filed on Sep. 8, 2008.

(51) Int. Cl.
*G01N 21/00*    (2006.01)
*G01B 11/16*    (2006.01)
*G01J 3/44*    (2006.01)

(52) U.S. Cl.
USPC .......................... 356/73.1; 356/32; 356/301

(58) Field of Classification Search
CPC .... G01B 11/18; G01M 3/047; G01M 5/0025; G01M 5/0033; G01M 5/0091; G01L 1/246

USPC ......... 356/300, 301, 32, 34, 73.1; 73/152.01, 73/152.31, 53.01
See application file for complete search history.

(56) References Cited

U.S. PATENT DOCUMENTS 4,654,520 A * 3/1987 Griffiths .................... 250/227.14
5,804,713 A * 9/1998 Kluth .......................... 73/152.01
(Continued)

FOREIGN PATENT DOCUMENTS

| GB | 2436142 A * | 9/2007 |
| KR | 1020050108328 | 11/2005 |
| WO | 9827406 | 6/1998 |

OTHER PUBLICATIONS

Thevenaz L "Review and Progress in Distributed Fiber Sensing" In: Optical Fiber Sensors (OFS) Conference 2006, Oct. 23, 2006.
Ricardo De Oliveira Carneval, Mauro Gonçalves Marinho, Joilson M. dos Santos, "Flexible Line Inspection," ECNDT 2006—Poster 106, Petrobras, Macaé, Brazil.

(Continued)

*Primary Examiner* — Gregory J Toatley
*Assistant Examiner* — Shawn Decenzo
(74) *Attorney, Agent, or Firm* — Matthias Abrell (57) ABSTRACT

A system and method for detecting breakage, rupture or malfunctioning of a pipe or cable structure, including sensing elements for monitoring the structure and placed in, on or around the structure for monitoring the breakage, rupture or malfunctioning of the structure. The sensing elements provide sensing data regarding events related to breakage, rupture or malfunctioning and are placed near the structure so as to perform a breakage, rupture or malfunction detection function, and within a distance sufficient to obtain a measureable strain, tension, torsion, vibration, acceleration, and/or temperature response signal based on the breakage, rupture or malfunctioning of the structure. One of the sensing elements is based on Coherent Rayleigh Noise (CRN) sensing techniques, and the system is configured to interpret the sensed data for determining the breakage, rupture or malfunctioning of the structure.

28 Claims, 5 Drawing Sheets

(56) References Cited

U.S. PATENT DOCUMENTS

| | | | |
|---|---|---|---|
| 5,918,641 A * | 7/1999 | Hardy et al. | 138/132 |
| 6,644,848 B1 | 11/2003 | Clayton et al. | |
| 6,913,079 B2 | 7/2005 | Tubel | |
| 7,296,480 B2 | 11/2007 | De Aquino | |
| 7,697,143 B2 * | 4/2010 | Sanders et al. | 356/460 |

OTHER PUBLICATIONS

Mauro G. Marinho, et al., "New Techniques for Integrity Management of Flexible Riser-End fitting Connection," Proceedings of the ASME 27th International Conference on Offshore Mechanics and Arctic Engineering, OMAE 2008, Jun. 15-20, 2008.

* cited by examiner

SYSTEM AND METHOD FOR DETECTION OF FLEXIBLE PIPE ARMOR WIRE RUPTURES

CROSS REFERENCE TO RELATED APPLICATIONS

The invention is related to and claims the benefit of priority from U.S. Provisional Patent Application Ser. No. 61/094,996 of Ramos, entitled "FLEXIBLE PIPE ARMOR WIRE RUPTURE MONITORING SYSTEM," filed on Sep. 8, 2008, the entire contents of the disclosures of which is hereby incorporated by reference herein.

BACKGROUND OF THE INVENTION

1. Field of the Invention

The invention generally relates to methods and systems for detecting failures in pipe structures, and more particularly to a system and method for detecting breakage, rupture or malfunctioning of one or more components, such as an armor wire, and the like, of a complex pipe or cable, such as flexible pipe structure, and the like.

2. Discussion of the Background

The complexity of tubular structures, for example, used in oil and gas subsea exploration is increasing to satisfy the many requirements in terms of thermal behavior, geometry, multiple fluid flows, flexibility and mechanical characteristics. Some of the configurations for such structures include pipe in pipe, insulated pipe and multiple pipe bundles. Umbilicals or risers may be used to connect wells or facilities at the sea bed to floating facilities, and the like, at the sea surface. However, such connections are subject to structural failure, for example, due to fatigue, corrosion, erosion or blockage, and the like, and which can be caused by the deposition of parts of the flow components (such as wax, hydrates, scales, asphaltenes, etc.) on such structures. Accordingly, there is a need to monitor such connections and structures in order to prevent such structural failure.

SUMMARY OF THE INVENTION

The above and other needs and problems are addressed by the exemplary embodiments of the present invention, which provide a novel system and method for detecting breakage, rupture or malfunctioning of one or more components, such as an armor wire, and the like, of a complex pipe or cable, such as flexible pipe structure, and the like. In an exemplary embodiment, at least one sensing element is placed in, on or around a component of a structure being monitored and used for monitoring the breakage, rupture or malfunctioning of the component of the structure, wherein the sensing element is used to provide information on events related to the breakage, rupture or malfunctioning of the component. The sensing element can be placed close enough to the component of the structure being monitored to perform the rupture detection function, such as within any suitable distance sufficient to obtain a measureable strain, tension, torsion, vibration, acceleration, temperature, and the like, response, based on the breakage, rupture or malfunctioning of the component of the structure. The sensing element can employ Coherent Rayleigh Noise (CRN) techniques, and the like, and can be combined with other sensors, such as accelerometers, and the like, and the method and system is configured to interpret the sensed data for determining the breakage, rupture or malfunctioning of the component of the structure.

Accordingly, in an exemplary aspect of the present invention there is provided a system and method for detecting breakage, rupture or malfunctioning of a pipe or cable structure, including sensing elements for monitoring the structure and placed in, on or around the structure for monitoring the breakage, rupture or malfunctioning of the structure. The sensing elements provide sensing data regarding events related to breakage, rupture or malfunctioning and are placed near the structure so as to perform a breakage, rupture or malfunction detection function, and within a distance sufficient to obtain a measureable strain, tension, torsion, vibration, acceleration, and/or temperature response signal based on the breakage, rupture or malfunctioning of the structure. One of the sensing elements is based on Coherent Rayleigh Noise (CRN) sensing techniques, and the system is configured to interpret the sensed data for determining the breakage, rupture or malfunctioning of the structure.

Still other aspects, features, and advantages of the present invention are readily apparent from the entire description thereof, including the figures, which illustrate a number of exemplary embodiments and implementations. The invention is also capable of other and different embodiments, and its several details can be modified in various respects, all without departing from the spirit and scope of the invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION

Various embodiments and aspects of the invention will now be described in detail with reference to the accompanying figures. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited. Further, whenever a composition, a group of elements or any other expression is preceded by the transitional phrase "comprising", "including" or "containing", it is understood that it is also contemplated the same composition, the group of elements or any other expression with transitional phrases "consisting essentially of", "consisting", or "selected from the group of consisting of", preceding the recitation of the composition, the elements or any other expression.

The term "system" may also be referred to herein as "apparatus".

The present invention includes recognition that flexible pipe structures are used as umbilicals or risers or flow lines or offload lines or other subsea applications. Although flexibility of such structures helps to reduce stresses due to movement, they are susceptible to deterioration and/or rupture during transport, deployment and/or operation. They also can experience flow assurance problems. Accordingly, the present invention provides a system and method for detecting a rupture in an armor layer or other components of a pipe structure. The structures which can be the subject of this invention can include any suitable structures, wherein detection of ruptures is needed, such as any subsea pipe, subsea structure, e.g., a flexible pipe, such as a flexible riser or an umbilical. Such structures are known in the art, see, e.g., U.S. Pat. Nos. 7,296,480 and 5,918,641, incorporated herein by reference.

Figure 1:
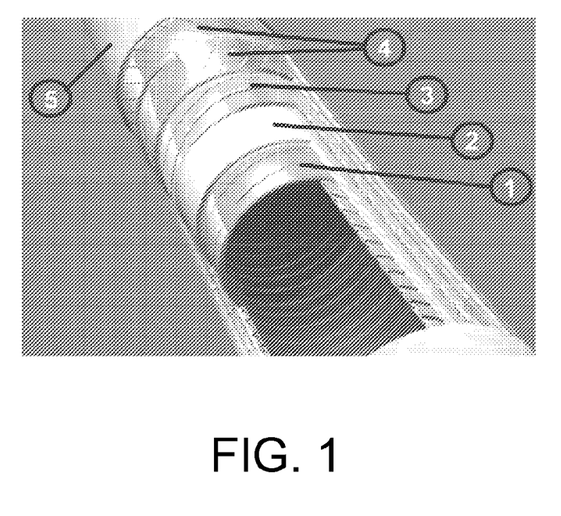
FIG. 1 is an exemplary structure in the form of a flexible pipe, such as a pipe that can be used for subsea oil and gas exploration.

Referring now to the drawings, wherein like reference numerals designate identical or corresponding parts throughout the several views, and more particularly to FIG. 1 thereof, there is illustrated a typical composition of a flexible pipe. The layers and their respective functions and characteristics are described below and are further described in ECNDT 2006-Poster 106, "Flexible Line Inspection," Ricardo DE OLIVEIRA CARNEVAL, Mauro Gonçalves MARINHO, Joilson M. dos Santos, PETROBRAS, Macaé, Brazil; and Mauro G. Marinho, Caudio S. Camerini, Sergio R. Morikawa, Daniel R. Pipa, Gustavo P. Pires, João M. Santos, Agildo B. Moreira, "NEW TECHNIQUES FOR INTEGRITY MANAGEMENT OF FLEXIBLE RISER-END FITTING CONNECTION," Proceedings of the ASME 27th International Conference on Offshore Mechanics and Arctic Engineering, OMAE2008, Jun. 15-20, 2008, Estoril, Portugal, OMAE2008-57929, incorporated herein by reference.

In FIG. 1, the flexible pipe includes an interlocked steel carcass 1 that is resistant to hydrostatic pressure, to radial compression during installation, and which supports an inner thermoplastic sheath 2. The carcass 1 is generally manufactured with stainless steel (e.g., AISI 304 or 316). The inner thermoplastic sheath 2 promotes sealing, prevents internal fluids (e.g., oil, gas or water) from permeating to the external layers. The inner thermoplastic sheath 2 is manufactured with nylon or a similar material. An interlocked steel pressure layer 3 is provided, which is configured to resist internal and hydrostatic pressure and radial compression. The pressure layer 3 is usually manufactured with carbon steel or similar material. Double cross wound tensile armors 4 (which may also be referred to as "armor layer") are configured to resist axial forces, internal pressure and torsion. An external thermoplastic sheath 5 protects the internal layers against external agents, such as corrosion and abrasion, to maintain the double cross wound tensile armors 4 together, and assure sealing of the flexible pipe structure. The sheath 5 is usually manufactured with a polymer, such as nylon, and the like.

Figure 2:
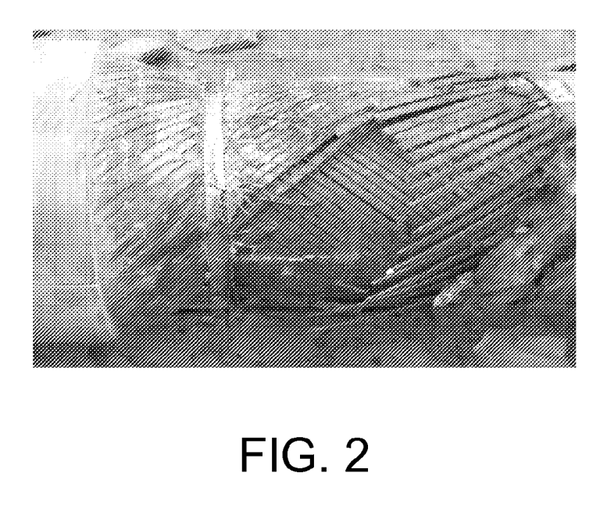
FIG. 2 illustrates armor wire rupture caused by fatigue at the interface tube/end fitting of the flexible pipe structure of FIG. 1.

Studies with respect to the inspection and maintenance of flexible pipes indicate that the major causes of failure include: (1) rupture of the armor wire layer 4 caused by fatigue at the interface tube/end fitting, as shown in FIG. 2; (2) sealing failure of the inner sheath 2 due to degradation; (3) dislocation inside of the end fitting; (4) corrosion of the armor layer 4 and carcass 1; and (5) torsional instability. Ruptures in the armor layer 4 can result in failures of the flexible pipe structure. Accordingly, the present invention provides a system and method for detecting a rupture in an armor layer of a pipe structure, such as a flexible pipe or riser structure, and the like.

Figure 3:
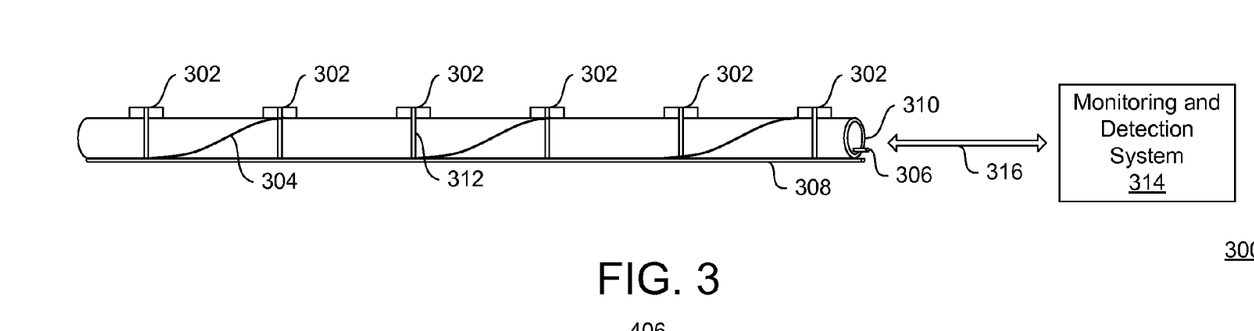
FIG. 3 is used to illustrate an exemplary system and method for detecting breakage, rupture or malfunctioning of one or more components a structure.

FIG. 3 is used to illustrate an exemplary system and method 300 for detecting breakage, rupture or malfunctioning of one or more components, such as an armor wire, and the like, of a complex pipe or cable, such as flexible pipe structure, and the like. In FIG. 3, the exemplary system and method 300 can include one or more sensing elements or sensors 302-308 configured to monitor or detect the breakage, rupture or malfunctioning of a component of a structure 310, such as flexible pipe structure, and the like. The sensing elements 302-308 can be located in, on and/or around the structure 310, as shown in FIG. 1.

The sensing elements 302-308 can be configured to detect one or more of strain, tension, torsion, vibration, acceleration, temperature, and the like. The sensing elements 302-308 can include optical sensors, optical fiber sensors, and the like, which can be based on one or more of Coherent Rayleigh Noise (CRN) sensing, Fiber Bragg Grating (FBG) sensing, Brillouin Scattering Sensing (BSS), Raman Scattering Sensing (RSS), and the like. The sensing elements 302-308 also can include one or more of accelerometers, strain gauges, and the like. The sensing elements 302 also can include an array of sensors, distributed sensors, and the like.

Accordingly, in an exemplary embodiment, a combination of different types of the sensing elements 302-308 can be used to generate sensing data to be interpreted for monitoring or detecting the breakage, rupture or malfunctioning of a component of the structure 310. The data can be interpreted in terms of events, such as events that are associated to breakage or rupture of one or more components of the structure 310. In an exemplary embodiment, the sensing elements 302-308 are attached to the structure 310, for example, using any suitable attachment devices 312, such as ring clamps, adhesives, straps, cable ties, tie wraps, ratchet wraps, ring clamps, and the like.

The sensing elements 302-308 can be incorporated into the structure 310, such as a flexible pipe, and the like, during manufacturing or commissioning thereof, and the structure 310 can be located under the surface of water or ground and may be part of an oil or gas installation.

The sensing elements 302-308 can be single point sensors, an array of sensors, distributed sensors, and the like. Optical fiber sensors are particularly well suited for this application. Distributed Temperature Sensors (DTS) based on Raman or Brillouin scattering can also be used. Fiber Bragg Grating (FBG) sensors can also be used, as well as interferometric sensors, and the like. If distributed or multiple sensors are used, the detecting of the breakage, rupture or malfunctioning of the flexible pipe or other structure 310 and location thereof can be obtained from the corresponding signals.

The exemplary system and method 300 can be used to detect the breaking of armor wires of the structure 310, such as a flexible riser. For example, when the armor wires break, an amount of energy is dissipated as the stress is taken by neighboring wires, wherein the vibrations produced when a wire breaks can be measured using a monitoring and detection system 316, for example, such as a fiber optic Coherent Rayleigh Noise (CRN) system, and the like. The monitoring and detection system 314 can be coupled to the sensors 302-308 with a cable 316. In the case of a CRN system 314, the CRN system 314 can provide distributed vibration measurements along optical fibers of the sensing elements 302-308, for example, with a resolution of <10 m.

In an exemplary embodiment, optical fibers, for example, of the sensors 302 can be configured as point sensors, wherein a multiplicity of fiber can be packed in a localized space, for example, by configuring the fiber as a fiber optic coil configured to contact a surface of the flexible riser 310. Such fiber optic coils can be placed in an enclosure, such as a container, plate, and the like, which is configured to conform to and contact a surface of the flexible riser 310, and which advantageously, can be coupled to the riser 310 via an interface layer, as further described with respect to FIG. 4.

The surface of the riser 310 includes the thermoplastic sheath 5, typically, with no available anchor points. Accordingly, optimal bonding of the optical fibers of the sensors 302-308 to the structure 310 allows for effective detection and classification of sensor signals created by a structural failure.

The optical fibers of the sensors 302-308 can incorporate environmental protection for the fibers thereof. For example, if wind or rain comes into direct contact with the fibers on the surface or waves, currents or objects come into direct contact with the fibers underwater, this will result in a sudden large temperature change that will manifest itself as a low frequency noise signal that will become more significant with larger temperature changes. The change in temperature throughout the day and night can cause a similar problem. Accordingly, to address the temperature problem, the rate at which the fibers change temperature can be reduced, so as to smooth such transitions over the longest possible time. For example, a slower temperature transition reduces the frequency range over which the sensing signal data will be masked by temperature effects. The external thermoplastic sheath 5, which makes up the surface of the flexible riser 310, is a fairly good insulator to changes in temperature and therefore there is no need to shield the fibers from temperature changes at the surface of the riser 310.

In addition, if the wind, rain, waves, currents, and the like, cause the fibers of the sensors 302-308 to suddenly move, this will result in large spurious signals being generated. Accordingly, the fibers can be insulated from such environmental factors and advantageously can be securely anchored to the riser 310, such that the fibers will not move significantly. To aid in good transmission of the sensing signals, damaged areas of the riser 310 can be avoided when attaching the sensors 302-308 or such damaged areas can be smoothed away to create a flattened attachment surface prior to mounting the sensors 302-308.

In an exemplary embodiment, sensing signals from the sensors 302-308 can be used to detect the snapping, for example, of the strands of metal in the armor layers 4 of the riser 310. The fibers of the sensors 302-308 are vibrationally coupled to the riser 310, such that low level background noise and other events do not obscure detection, so that the monitoring and detection system 314 is capable of a clear detection of target sensing signals.

When fixedly attaching the sensor 302-308 to the riser 310, the stability of the contact should be such that sensors 302-308 are not allowed to rock or vibrate significantly on the surface of the riser 310, as this can create additional noise, which may obscure the target sensing signal. The contact can also be made sufficiently small, such that as the riser 310 bends, stretches, and the like, the riser 310 does not place excessive force on the contact mechanism causing it to fail.

Glues, epoxies, other adhesives, and the like, can be employed to mount the sensors 302-308 to the riser 310. As the surface of the riser is made of a thermoplastic material, glues and adhesives may be useful in affixing the fibers of the sensors 302-308 the surface of the riser 310. However, a problem with using glues and adhesives is that they can permanently damage the surface of the riser 310 and cannot be easily removed.

In further exemplary embodiments, an interface layer, such as a thin layer of rubber matting, wax (e.g., bees wax, microcrystalline wax, etc.), and the like, can be provided on the surface of the riser 310 and the fibers of the sensors 302-308 can be disposed over the interface layer. The interface layer can be configured to grip the surface of the riser 310, for example, due to force exerted by the fibers on the interface layer by the attachment devices 312.

The weak point in the fiber path from the sensors 302-308 to the monitoring and detection system 314 can be the connection between the sensors 302-308 on the riser 310 and the surface cable 316. If a fiber splice breaks then the system 314 can be blinded such that useful data cannot be collected. Accordingly, all suitable splices can be configured, for example, to withstand months of sustained vibration, and the inevitable accidental and high G force shipping impacts, which the system 300 can experience prior to commissioning. To reduce the risk of a splice failure, the splice from the sensing fibers of the sensors 302-308 to the surface cable 316 can be potted in epoxy during the manufacturing thereof to produce a single rigid unit with ruggedized fiber exiting therefrom. To further reduce the chance of damage to the splice, the fibers can be mounted into an enclosure, such a box, plate, and the like, as shown with respect to the sensors 302, and any suitable strain reducing mechanisms can be installed on the fiber cable 316.

When the riser 310 experiences an impact, for example, due to breakage of the armor wires 4, the different layers of the riser 310 material can attenuate the resulting signal, which can be attenuated even further based on how the fibers of the sensors 302-308 are bonded to the surface of the riser 310. A soft material will tend to attenuate the higher frequencies more than the lower frequencies, so it is advantageous to bond the fibers of the sensors 302-308 to the riser 310 in a rigid manner.

Figure 4:
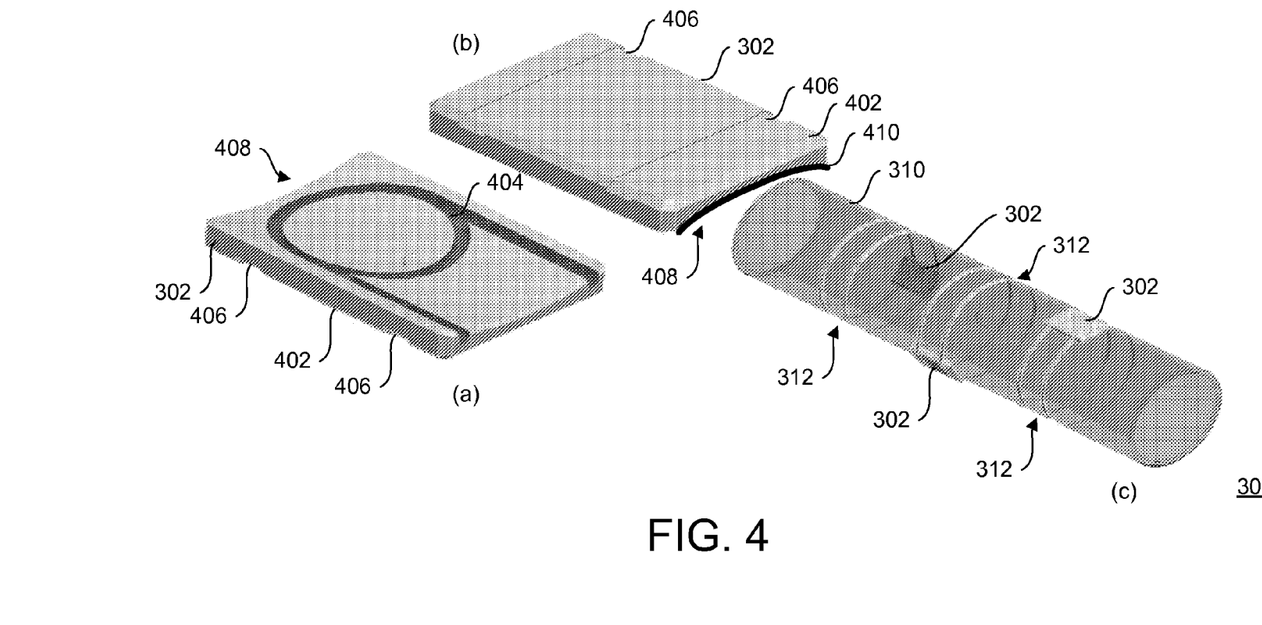
FIG. 4 is used to further illustrate exemplary sensors of the system of FIG. 3.

FIG. 4 is used to further illustrate the exemplary sensors 302 of the system 300 of FIG. 3. In FIG. 4, the sensors 302 can be constructed from a plate 402, such as an aluminum, plate, and the like, which has a profile 404 thereof milled out therefrom to allow the fibers of the sensors 302 to be installed and potted in place so as to be sensitive to vibration (e.g., using any suitable engineering and structural epoxy, acrylic, and polyurethane adhesives, such as Araldite 2020, etc.). A curved mounting surface 408, conforming to a shape of the outer surface of the riser 310, is used to hold the fibers of the sensors 302 in place against the riser 310. The sensors 302 can be strapped down onto the riser 310 via one or more (e.g., 10 mm) slots 406 on the top surface of the plate 402 to allow the attachment devices 312 (e.g., stainless steel cable ties, any other suitable strapping techniques, etc.) to be wrapped all the way around the riser 310, holding the sensors 302 in place. An interface layer 410, such as a thin layer of rubber or neoprene matting, wax, and the like, can be provided between the surface of the riser 310 and the fibers of the sensors 302. The interface layer 410 can be configured to grip to the surface of the riser 310, due to force exerted by the fibers of the sensors 302 on the interface layer 410, for example, via the attachment devices 312.

The curved mating surface 408 of the sensor 302 is configured to match with the surface of the riser 310. The arc on the curved mating surface 408 can be slightly larger than that of the riser 310 to accommodate changes in riser diameter, wherein any extra space between the sensor 302 and the riser 310 can be accommodated by the interface layer 410 to create an optimal sensor to riser contact.

The dimensions of the plate 402 and the profile 404 can be configured to accommodate various amounts of coiled fiber to contact the riser 310 at one point. However, there is a tradeoff between more fiber allowing the target sensing signal to be better identified, and creating far more data to be processed by the monitoring and detection system 314.

The monitoring and detection system 314 can be coupled to the sensors 302-308 to perform distributed vibration measurements. The system 314 can be configured for sensor data collection for real or near real time analysis and storage of the raw sensor data. An uninterruptible power supply (UPS) can be provided to ensure dependability. Sufficient network bandwidth is provided, for example, to allow data to be transferred to a server for remote administration over the internet, to change system configurations, delete data, transfer data, view data, and the like. Sufficient data storage is provided to permit at least one week of raw data to be stored, pending analysis, backup or deletion. Uninterruptible power is supplied, such that the system can correctly shutdown any computer systems, servers, instrumentation, and the like, wherein a minimum time while running on batteries can be on the order of 15 minutes. The overall system can include a server rack housing the server, storage array, UPS and CRN processing system. The system further includes other types of sensors, such as accelerometers to measure movement and vibrations, inclinometers to measure angles, and the like.

The interface layer 410 between the sensors 302 and the surface of the riser 310 can be configured to amplify the vibrational intensity created when an armor wire 4 breaks. For example, a level of damping provided by the interface layer 410 can be such that background noise is removed, leaving a strong signal from the armor wire 4 breaks.

Figure 5:
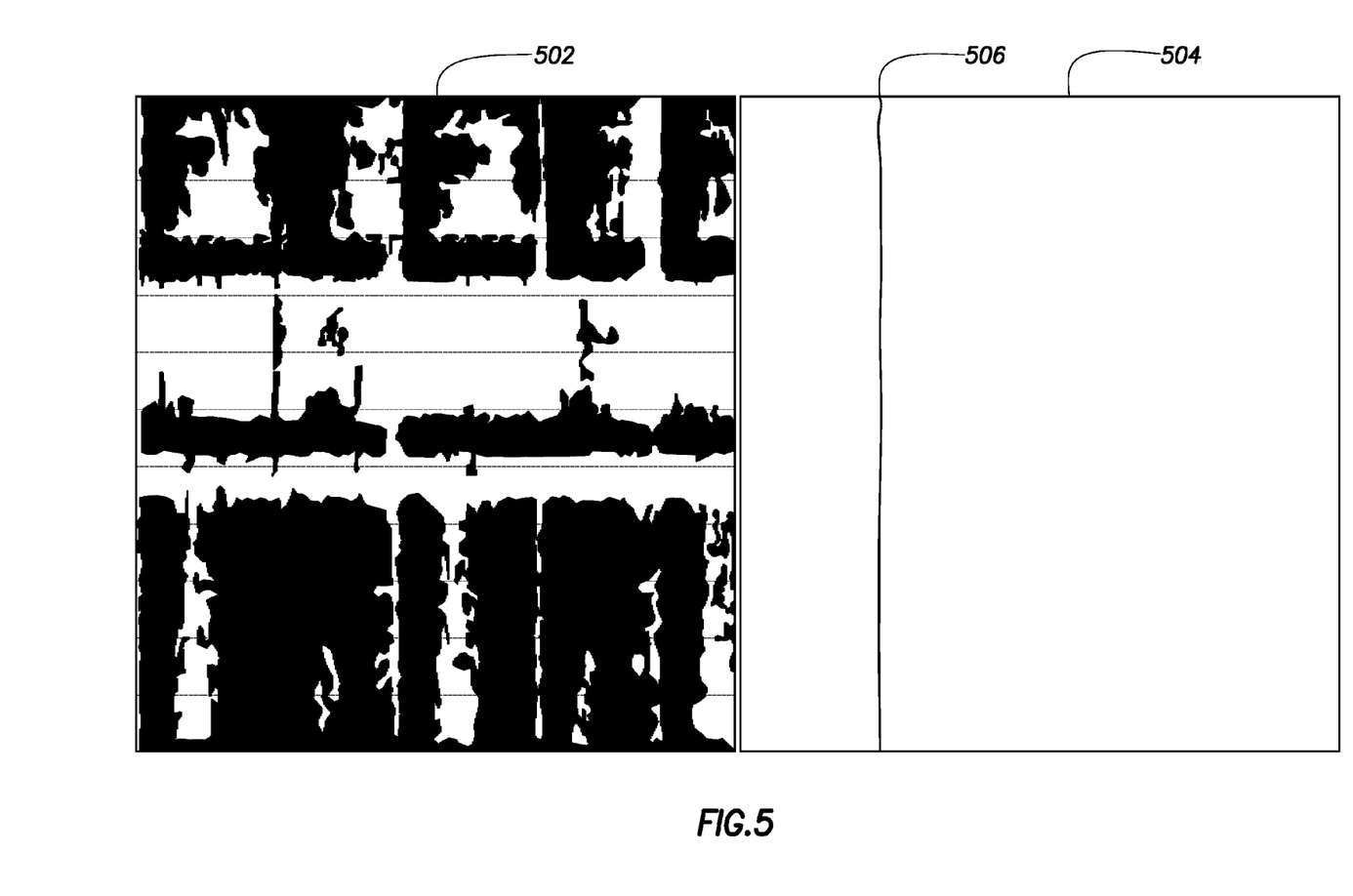
FIG. 5 illustrates exemplary Coherent Rayleigh Noise (CRN) data for detecting an armor wire break of a flexible riser.

FIG. 5 illustrates exemplary CRN data for detecting an armor wire 4 break of the flexible riser 310. In FIG. 5, the left hand side image 502 shows all of the CRN detected events in 45 seconds around the time of the break, the different colors (not shown) on the image representing signals with different spectral signatures. The spectral signatures from such classification come from analysis of terrestrial events during testing. When all of the other signal types corresponding to such events are turned off, as shown in the right hand image 504, all that remains is a single vertical line 506, with a few minor pixels distributed over time and fiber position. The line 506 is the break event, as detected by the monitoring and detection system 314 and has a line width of 0.1 to 0.2 seconds. The event was detected by all sensors 302 placed on the riser 310, although the quality of the signal varies based on a distance from the sensors 302 to the break.

Figure 6:
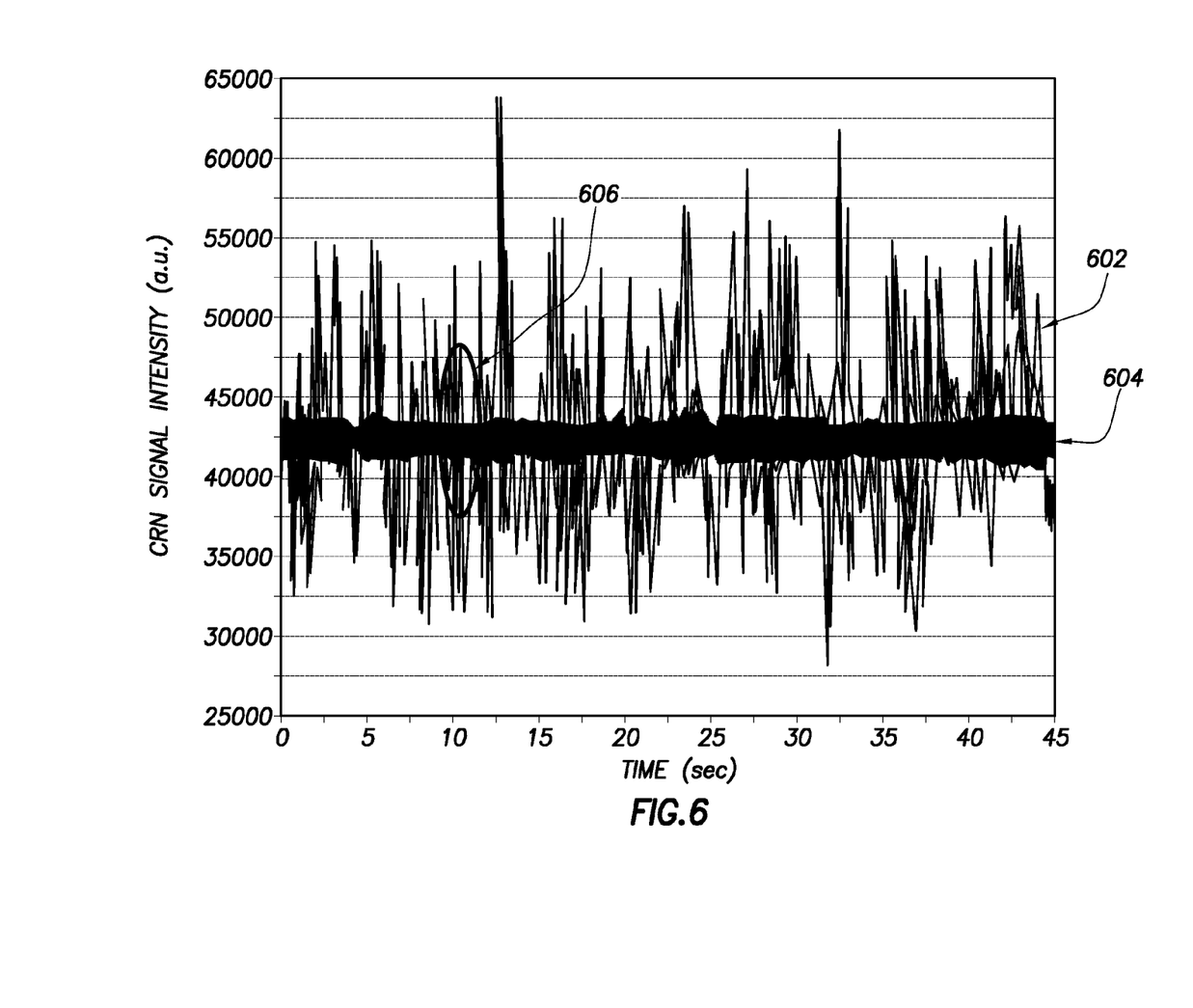
FIG. 6 illustrates raw CRN signal data 602 for a sensor having 100 m of coiled fiber therein.

FIG. 6 illustrates the raw CRN signal data 602 for a sensor 302 having 100 m of coiled fiber therein. In FIG. 6, the signal data 602 corresponds to the CRN processed images of FIG. 5. The armor wire 4 break is shown at around 10 seconds into the data stream, wherein the change in the signal is not readily visible in the trace 602. The trace 604 is the CRN data after application of a 100 Hz high pass filter, wherein, with such filter applied, a small peak is evident at the time of the wire break and shown by circle 606.

Figure 7:
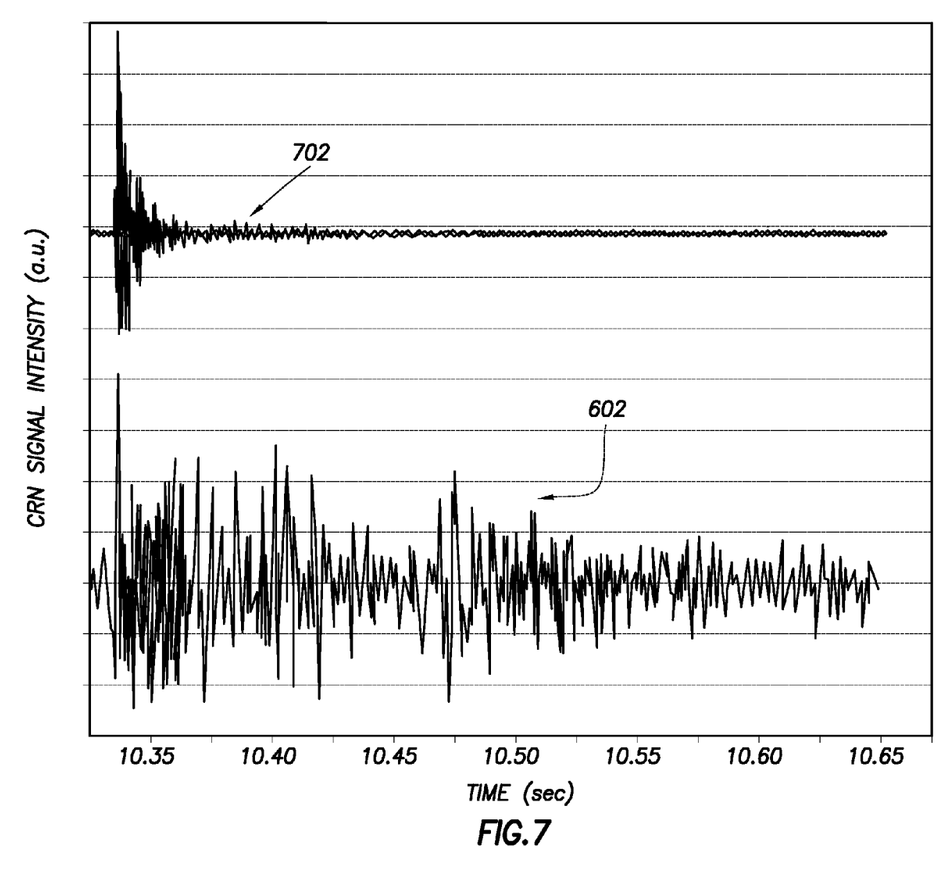
FIG. 7 illustrates a response signal from a three dimension accelerometer sensor versus CRN data from FIG. 6.

FIG. 7 illustrates a response signal 702 from a three dimension accelerometer sensor versus the CRN data 602 from FIG. 6. In FIG. 7, one can observe some similarities between the signals 602 and 702, wherein over the short period when the break 606 is detected by the accelerometer, the frequency and amplitude of the CRN signal 602 visibly varies. In further exemplary embodiments, direct quantitative comparison between the two signals 602 and 702 can be made possible, by taking into account the nature of the CRN signal 602 and the fact that such signal 602 data is processed and filtered. The accelerometer sensor signal 702 provides a direct linear measure of the riser 310 movement, whereas the CRN measurement sensor signal 602 measures the variation in light, which occurs when the corresponding fiber of the sensor 302 is deformed. The detection of the break event 606 shown in FIG. 6 is due to the CRN processing algorithms, which act in the frequency domain, rather than the time domain.

In an exemplary embodiment, the monitoring and detection system 314 can be configured to employ a library of signals configured for classifying and distinguishing armor wire 4 break events from other types of events or impacts, so that positive indication of armor wire 4 breaks is performed. Such events can then be correlated, and the break events can be understood with regard to classifying their time/frequency fingerprint, and the like. In addition to the detection and classification of the break signals with the sensors 302, a fiber sensor distributed along the length of the riser 310 can be used by the system 300 to track the path of the vibrations caused by the break of the armor wire 4, and provide the location where the break occurred.

In further exemplary embodiments, in addition to the system method of FIGS. 4-7 having the sensors 302 configured as point sensors, the system can be configured as a fully distributed system, wherein the events to be detected can also be located along the riser 310. Advantageously, such a distributed system can be configured to differentiate signals from the events to be detected from any spurious signals, such as instrument errors, signals originating at the surface, and the like.

In further exemplary embodiments, the system of FIGS. 4-7 can further include a sensing fiber (e.g., single or multimode, etc.) provided on an umbilical or the riser 310, and the like. Advantageously, such a system can be configured to provide information regarding typical background signals to increase the ability of the system to distinguish signals from the events to be detected from the background signals.

The above-described devices and subsystems of the exemplary embodiments of FIGS. 1-7 can include, for example, any suitable servers, workstations, personal computers (PCs), laptop computers, personal digital assistants (PDAs), Internet appliances, handheld devices, cellular telephones, wireless devices, other electronic devices, and the like, capable of performing the processes of the exemplary embodiments of FIGS. 1-7. The devices and subsystems of the exemplary embodiments of FIGS. 1-7 can communicate with each other using any suitable protocol and can be implemented using one or more programmed computer systems or devices.

One or more interface mechanisms can be used with the exemplary embodiments of FIGS. 1-7, including, for example, Internet access, telecommunications in any suitable form (e.g., voice, modem, and the like), wireless communications media, and the like. For example, the employed communications networks can include one or more wireless communications networks, cellular communications networks, 3 G communications networks, Public Switched Telephone Network (PSTNs), Packet Data Networks (PDNs), the Internet, intranets, a combination thereof, and the like.

It is to be understood that the devices and subsystems of the exemplary embodiments of FIGS. 1-7 are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments of FIGS. 1-7 can be implemented via one or more programmed computer systems or devices.

To implement such variations as well as other variations, a single computer system can be programmed to perform the special purpose functions of one or more of the devices and subsystems of the exemplary embodiments of FIGS. 1-7. On the other hand, two or more programmed computer systems or devices can be substituted for any one of the devices and subsystems of the exemplary embodiments of FIGS. 1-7. Accordingly, principles and advantages of distributed processing, such as redundancy, replication, and the like, also can be implemented, as desired, to increase the robustness and performance the devices and subsystems of the exemplary embodiments of FIGS. 1-7.

The devices and subsystems of the exemplary embodiments of FIGS. 1-7 can store information relating to various processes described herein. This information can be stored in one or more memories, such as a hard disk, optical disk, magneto-optical disk, RAM, and the like, of the devices and subsystems of the exemplary embodiments of FIGS. 1-7. One or more databases of the devices and subsystems of the exemplary embodiments of FIGS. 1-7 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-7 can include appropriate data structures for storing data collected and/or generated by the processes of the devices and subsystems of the exemplary embodiments of FIGS. 1-7 in one or more databases thereof.

All or a portion of the devices and subsystems of the exemplary embodiments of FIGS. 1-7 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 1-7 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1-7, for driving the devices and subsystems of the exemplary embodiments of FIGS. 1-7, for enabling the devices and subsystems of the exemplary embodiments of FIGS. 1-7 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 1-7. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1-7 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

Although the exemplary embodiments are described in terms of the noted structures, such as flexible pipes or risers, the exemplary embodiments can be applied to any suitable structures, such pipes, pipes in pipes, integrated production bundles, offloading pipes, jumpers, risers, umbilicals, Christmas trees, flexible pipes, manifolds, control units, well heads, pieces of subsea equipment, flow lines, cables, and the like, as will be appreciated by those skilled in the relevant art(s).

While the inventions have been described in connection with a number of exemplary embodiments, and implementations, the inventions are not so limited, but rather cover various modifications, and equivalent arrangements, which fall within the purview of the appended claims.

What is claimed is:

1. A system for detecting breakage, rupture or malfunctioning of a pipe or cable structure, the system comprising: a plurality of sensing elements for monitoring a pipe or cable structure, wherein the sensing elements are placed in, on or around the pipe or cable structure being monitored and used for monitoring the breakage, rupture or malfunctioning of the pipe or cable structure, the sensing elements provide sensing data regarding events related to breakage, rupture or malfunctioning of the pipe or cable structure, and the sensing elements are placed near the pipe or cable structure being monitored so that the system can perform a breakage, rupture or malfunction detection function, and within a distance sufficient to obtain a measureable strain, tension, torsion, vibration, acceleration, and/or temperature response signal based on the breakage, rupture or malfunctioning of the pipe or cable structure, at least one of the sensing elements is an optical sensor or an optical fiber sensor configured as a plurality of optical fiber loops enclosed within a plate attached to the pipe or cable structure, and the system is configured to interpret the measureable strain, tension, torsion, vibration, acceleration, and/or temperature response signal for determining the breakage, rupture or malfunctioning of the pipe or cable structure.

2. The system of claim 1, wherein the pipe or cable structure comprises a flexible pipe structure comprising one or more armor wires of an armor layer of the flexible pipe structure.

3. The system of claim 1, wherein at least one of the sensing elements is based on Fiber Bragg Grating (FBG) sensing, Brillouin Scattering Sensing (BSS), Raman Scattering Sensing (RSS) and/or interferometric sensing.

4. The system of claim 1, wherein at least one of the sensing elements is a Distributed Temperature Sensor (DTS) based on Raman or Brillouin scattering sensing.

5. The system of claim 1, wherein the optical sensor or optical fiber sensor is based on Coherent Rayleigh Noise (CRN).

6. The system of claim 2, wherein the sensing elements are incorporated into the flexible pipe structure during manufacturing or commissioning thereof.

7. The system of claim 1, wherein the pipe or cable structure is a flexible pipe, an umbilical, a pipe in pipe, a flow line, a jumper, a cable, a manifold, or a well head.

8. The system of claim 1, wherein the pipe or cable structure is under the surface of water or ground.

9. The system of claim 1, wherein the pipe or cable structure is part of an oil or gas installation.

10. The system of claim 1, wherein the plate is attached to the pipe or cable structure with one or more attachment devices, including ring clamps, adhesives, straps, cable ties, tie wraps, ratchet wraps, ring clamps.

11. The system of claim 10, wherein an interface layer is provided between the plate and the pipe or cable structure, and the interface layer is made of an adhesive, neoprene or wax material.

12. The system of claim 1, wherein the optical sensor or optical fiber sensor is combined with the plurality of sensing elements, including an accelerometer.

13. The system of claim 1, wherein the pipe or cable structure is a power cable.

14. The system of claim 1, wherein the system is configured for detecting the breakage, rupture or malfunctioning of a component of the pipe or cable structure, wherein the sensing elements are placed in, on or around the component of the pipe or cable structure being monitored and used for monitoring the breakage, rupture or malfunctioning of the component of the pipe or cable structure, the sensing elements provide sensing data regarding events related to the breakage, rupture or malfunctioning of the component, and the sensing elements are placed near the component of the pipe or cable structure being monitored so that the system can perform the breakage, rupture or malfunction detection function, and within a distance sufficient to obtain the measureable strain, tension, torsion, vibration, acceleration, and/or temperature response signal based on the breakage, rupture or malfunctioning of the component of the pipe or cable structure, and the system is configured to interpret the measureable strain, tension, torsion, vibration, acceleration, and/or temperature response signal for determining the breakage, rupture or malfunctioning of the component of the pipe or cable structure.

15. A method for detecting breakage, rupture or malfunctioning of a pipe or cable structure, the method comprising: providing a plurality of sensing elements for monitoring a pipe or cable structure; placing the sensing elements in, on or around the pipe or cable structure being monitored and monitoring with the sensing elements the breakage, rupture or malfunctioning of the pipe or cable structure; providing by the sensing elements, sensing data regarding events related to breakage, rupture or malfunctioning of the pipe or cable structure; placing the sensing elements near the pipe or cable structure being monitored and performing a breakage, rupture or malfunction detection function, and within a distance sufficient to obtain a measureable strain, tension, torsion, vibration, acceleration, and/or temperature response signal based on the breakage, rupture or malfunctioning of the pipe or cable structure, wherein at least one of the sensing elements is configured as a plurality of optical fiber loops enclosed within a plate attached to the pipe or cable structure; and interpreting the measureable strain, tension, torsion, vibration, acceleration, and/or temperature response signal for determining the breakage, rupture or malfunctioning of the pipe or cable structure.

16. The method of claim 15, wherein the pipe or cable structure comprises a flexible pipe structure comprising one or more armor wires of an armor layer of the flexible pipe structure.

17. The method of claim 15, wherein at least one of the sensing elements is based on Fiber Bragg Grating (FBG) sensing, Brillouin Scattering Sensing (BSS), Raman Scattering Sensing (RSS) and/or interferometric sensing.

18. The method of claim 15, wherein at least one of the sensing elements is a Distributed Temperature Sensor (DTS) based on Raman or Brillouin scattering sensing.

19. The method of claim 15, wherein the optical sensor or an optical fiber sensor is based on Coherent Rayleigh Noise (CRN).

20. The method of claim 16, further comprising incorporating the sensing elements into the flexible pipe structure during manufacturing or commissioning thereof.

21. The method of claim 15, wherein the pipe or cable structure is a flexible pipe, an umbilical, a pipe in pipe, a flow line, a jumper, a cable, a manifold, or a well head.

22. The method of claim 15, wherein the pipe or cable structure is under the surface of water or ground.

23. The method of claim 15, wherein the pipe or cable structure is part of an oil or gas installation.

24. The method of claim 15, wherein the plate is attached to the pipe or cable structure with one or more attachment devices, including ring clamps, adhesives, straps, cable ties, tie wraps, ratchet wraps, ring clamps.

25. The method of claim 24, further comprising providing an interface layer between the plate and the pipe or cable structure, wherein the interface layer is made of an adhesive, neoprene or wax material.

26. The method of claim 19, further comprising combining the optical sensor or optical fiber sensor with the plurality of sensing elements, including an accelerometer.

27. The method of claim 15, wherein the pipe or cable structure is a power cable.

28. The method of claim 15, further comprising: detecting the breakage, rupture or malfunctioning of a component of the pipe or cable structure; placing the sensing elements in, on or around the component of the pipe or cable structure being monitored for monitoring the breakage, rupture or malfunctioning of the component of the pipe or cable structure; providing by the sensing elements, sensing data regarding events related to the breakage, rupture or malfunctioning of the component; placing the sensing elements near the component of the pipe or cable structure being monitored and performing the breakage, rupture or malfunction detection function, and within a distance sufficient to obtain a measureable strain, tension, torsion, vibration, acceleration, and/or temperature response signal based on the breakage, rupture or malfunctioning of the component of the pipe or cable structure; and interpreting the measureable strain, tension, torsion, vibration, acceleration, and/or temperature response signal for determining the breakage, rupture or malfunctioning of the component of the pipe or cable structure.

\* \* \* \* \*